United States Patent [19]

Hagemann

[11] 4,282,395

[45] Aug. 4, 1981

[54] HIGH MELTING POINT GLASS-TO-METAL SEAL AND MELT CONNECTION, PARTICULARLY FOR TUNGSTEN SUPPLY WIRES FOR HIGH-PRESSURE DISCHARGE LAMPS

[75] Inventor: Josef Hagemann, Obereichstätt, Fed. Rep. of Germany

[73] Assignee: Patent-Treuhand-Gesellschaft fur Elektrische Gluhlampen mbH, Munich, Fed. Rep. of Germany

[21] Appl. No.: 57,259

[22] Filed: Jul. 12, 1979

[30] Foreign Application Priority Data

Aug. 2, 1978 [DE] Fed. Rep. of Germany ....... 2833896

[51] Int. Cl.$^3$ .............................................. H01J 5/00
[52] U.S. Cl. ................... 174/50.61; 313/184; 313/331; 403/29
[58] Field of Search ......... 174/50.61, 50.64, 152 GM; 313/184, 317, 318, 331; 403/28, 29, 30, 179

[56] References Cited

U.S. PATENT DOCUMENTS

| | | | |
|---|---|---|---|
| 2,114,869 | 4/1938 | Bol et al. ........................ | 174/50.61 |
| 2,135,661 | 11/1938 | Hagen et al. .................... | 174/50.61X |
| 3,140,417 | 7/1964 | Tietze .............................. | 313/256 |
| 3,742,283 | 6/1973 | Loughridge ..................... | 174/50.61 |

FOREIGN PATENT DOCUMENTS

886043 8/1953 Fed. Rep. of Germany.

*Primary Examiner*—Gene Z. Rubinson
*Assistant Examiner*—D. A. Tone
*Attorney, Agent, or Firm*—Frishauf, Holtz, Goodman & Woodward

[57] ABSTRACT

To permit direct melting-in of a rod or wire-shaped conductor through a glass wall of quartz glass (thermal coefficient of expansion: $5-6.10^{-7}/°C.$) in which the wire, for example, is tungsten (thermal coefficient of expansion: $45.10^{-7}/°C.$), two or more glasses having intermediate thermal coefficients of expansion are melted on, sequentially, on the conductor, and a final glass is applied thereto which, preferably, is the same as the quartz glass of the lamp envelope, and of very short axial length. The axial lengths of the respective glass coatings, sequentially applied, decrease with the first glass having a sufficient length to prevent any overlap of the second glass directly over the conductor, the quartz glass being preferably applied in form of a short cylinder, e.g. 4 mm long, for a 2 mm diameter tungsten conductor rod, so that, when melted together, the further glass layer, or layers, over the first one and the quartz cylinder form a circumferential bead of low heat capacity.

18 Claims, 7 Drawing Figures

HIGH MELTING POINT GLASS-TO-METAL SEAL AND MELT CONNECTION, PARTICULARLY FOR TUNGSTEN SUPPLY WIRES FOR HIGH-PRESSURE DISCHARGE LAMPS

The present invention relates to a melt connection to connect the supply wire, typically a tungsten supply wire, through a glass wall, especially to connect the supply wire as an electrode to the interior of a bulb forming a high-pressure discharge lamp.

BACKGROUND AND PRIOR ART

High-pressure lamps require special glasses to withstand the pressure therein. Typically such glasses are quartz glasses or other types of glasses which are high melting, that is, have a characteristic of melting only at an elevated temperature. Difficulties arise in sealing the connection leads which, typically, are of tungsten or the like, through the envelope walls of such lamps due to the difficulty in making a melt connection between the glass—of elevated melting point, and such glass coatings as can be applied to the tungsten wire.

It has previously been proposed to utilize a plurality of glasses with which a lead-through, particularly a tungsten lead-through is coated, the various glasses having different characteristics relating to temperature coefficient of expansion. It has been proposed to coat a tungsten wire with a first coating on which, in ring shape, further glass coatings are applied, forming transition glasses, which have temperature coefficients of expansion of decreasing value, the temperature coefficient decreasing as the transition glass rings are farther remote from the melt connection to the conductor. The last ring of the transition glass then has a tube of quartz glass melted thereon with one end, the other end of which is connected to a tubular portion or extension of the discharge tube itself. The result is a cap-like or dome-like melt. In another form, the tubular end of the discharge vessel is directly melted to the final rings of the transition glass itself, the glass wall of the vessel being quartz glass. Such a connection is shown and described in U.S. Pat. No. 3,140,417, with particular reference to FIGS. 1b to 1d. Such melts are suitable for lamps having an intermediate operating pressure.

It has also been proposed to make the lead-through by placing an elongated wrapping of quartz glass or of transition glasses or glass on the lead-through and then to melt on the tubular end of the discharge vessel, which is made of quartz-glass, over the entire length of this wrapping. Such melt connections utilize an excessive amount of materials and glass, are difficult to carry out in mass production and even under laboratory conditions, and, after melting-in, have undesirable stresses at the melt-in location. Such an arrangement is described, for example, in German Pat. No. 886,043.

Quartz/metal melts have to accomodate vastly different thermal coefficients of expansion. Directly melting-on of a glass vessel which is made of quartz glass on a transition glass is difficult in view of the great difference of the melting temperatures between the materials utilized—the difference in melting temperature may be in the order of 1300° C.

The linear thermal coefficient of expansion of tungsten is in the order of $45 \cdot 10^{-7}/°C.$, within the temperature range of from zero to 300° C.; quartz glass, which is the typical glass for use in high-pressure discharge lamps, has a thermal coefficient of expansion of about $5-6 \cdot 10^{-7}/°C.$ The transition glasses to melt in tungsten wires thus are usually so selected that there is a stepwise transition of the thermal coefficient of expansion between the material of the discharge vessel and of the metallic conductor. Glasses which can be melted on a tungsten wire, that is, transition glasses, have working temperatures in the order of between 660° to 800° C.; quartz glass has a working temperature of about 2000° C. These vast differences in thermal coefficients of expansion, and working temperatures to which the glasses can be subjected during the working processes make attachment of such glasses and tungsten lead-in wires extremely difficult.

THE INVENTION

It is an object to provide a melt connection which accepts these vast differences in characteristics of the materials, which can be readily handled under manufacturing and mass production conditions, and in which the unavoidable remaining stresses in the melt will occur only in the form of compressive forces.

Briefly, the connection between the conductor and the glass wall, e.g. a lamp wall of a very high melting point glass material, in which the conductor has a thermal coefficient of expansion which is substantially different from that of the glass, is made by using a plurality of transition glasses which are, in accordance with the invention, so arranged that a first transition glass having a thermal coefficient of expansion closer to that of the conductor than to the glass is applied over the conductor, by being melted thereon, the first coating or covering extending over a substantial longitudinal portion along the conductor; a second, or further transition glass, having a smaller thermal coefficient of expansion, that is, closer to that of the glass, is then placed over the first, but is axially shorter than the first one; if additional transition glasses are used, the axial length of each one is selected to be less and less; the last transition element is a short quartz glass cylinder having an axial length which is approximately the same as the thickness of the wall, e.g. of the bulb or vessel of the lamp with which the conductor is to be combined. Preferably, the connection or melt of the final coating, of quartz glass, to the quartz glass element of the wall of the vessel itself is in the form of a bead which, preferably, has a length to thickness ratio of the vessel of about 2:1 or somewhat less. The first coating directly applied to the conductor, e.g. a wire should extend at least 4 mm, in axial direction, from the end of the bead of the quartz glass.

DRAWINGS

Figure 3:
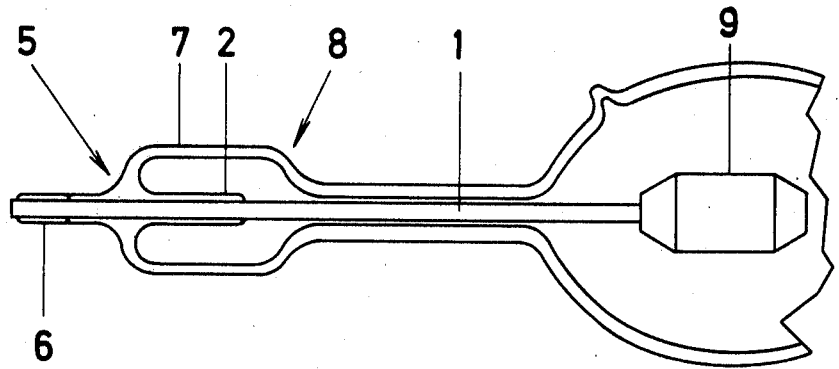
FIG. 3 is a fractional, highly schematic side view of a Xenon high-pressure lamp and illustrating the electrode secured to an end wall thereof.

An electrode lead 1 is made of tungsten, with a linear coefficient of expansion of $45 \cdot 10^{-7}/°C.$ in a temperature range of from zero to 300° C. The lamp envelope 8 is made of a quartz glass which has a thermal coefficient of expansion of $5-6 \cdot 10^{-7}/°$ C. FIG. 3 shows the simple and foreshortened end of a Xenon high-pressure discharge lamp with an inner electrode 9, for high pressure of more than 10 atm., preferably for operation at 35 atm. The melt is entirely suitable for such high pressures. The electrode lead 1 has a glass coating of a first transition glass 2 placed thereon which, by the addition of further transition glasses, forms a bead 5 which is melted transversely into the end wall 7 (FIGS. 2, 3) of the vessel. A glass coating 6, forming an oxidation-protective coating, is melted on the terminal end of the electrode 1 (omitted from FIG. 2 for clarity). The oxidation-protective glass 6 preferably has a thermal coefficient of expansion which matches that of the tungsten lead 1, that is, $45 \cdot 10^{-7}/°$ C.

The preparation of the tungsten lead 1, with the glass bead 5 thereon, is best illustrated in FIGS. 1a to 1e, to which reference will be made:

First, the metallic conductor or wire 1 of tungsten, with a rod diameter of 2 mm, receives a first coating of a first melt having the following composition (all percentages by weight):

| 81% | of | $SiO_2$ |
|---|---|---|
| 12 | | $B_2O_3$ |
| 5 | | $Al_2O_3$ |
| 1 | | BaO |
| 1 | | CaO. |

The glass forming the first coating 2 has a linear thermal coefficient of expansion of $19 \cdot 10^{-7}/°$ C. in a temperature range between zero and 300° C. This coating is about 2 cm long and has a thickness of between 0.5 to 0.8 mm. A second coating 3 is applied over the first coating 2. The second coating 3—see FIG. 1b—is a melt glass of the composition (all percentages by weight):

| 85.2% | of | $SiO_2$ |
|---|---|---|
| 9 | | $B_2O_3$ |
| 5 | | $Al_2O_3$ |
| 0.4 | | BaO |
| 0.4 | | CaO. |

The linear thermal coefficient of expansion of the glass 3 is $13 \cdot 10^{-7}/°$ C. The second coating 3 has an axial length of 7 mm, and it is applied intermediate the length of the coating 2, but somewhat asymmetrically with respect thereto, that is, the outer end of the coating 2 is somewhat shorter than the inner end which will, later on, form the connection to the electrode 9 (FIG. 3). The thickness of the coating 3 is in the order of about 0.5 to 2 mm.

Figure 1A:
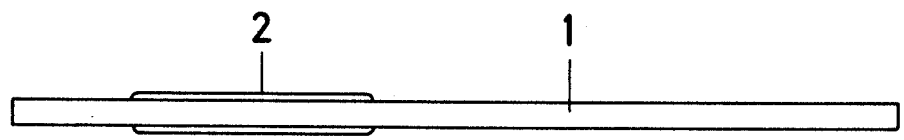
FIGS. 1a, 1b and 1c are schematic side views illustrating the treatment of the wire, in sequential steps, by application, successively, of transition glasses thereto.
Figure 1B:
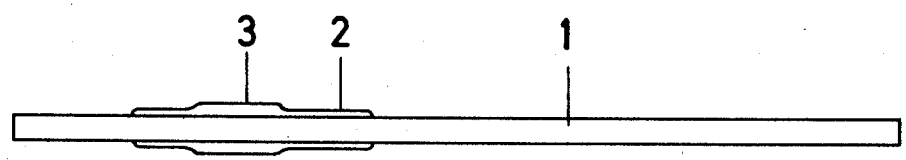
Figures 1D, 1E:
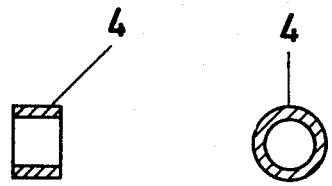
FIG. 1d and FIG. 1e are longitudinal and transverse sections, respectively, of quartz glass cylinders applied after the wire has been treated as shown in FIG. 1b, and forming a final transition glass.
Figure 1C:
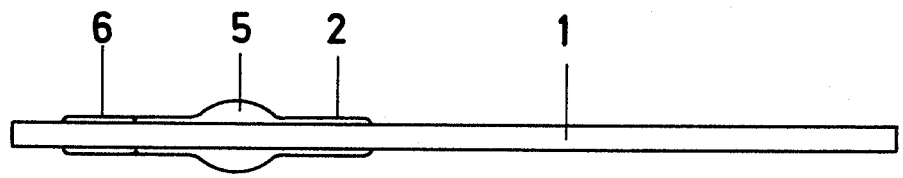
Figure 2:
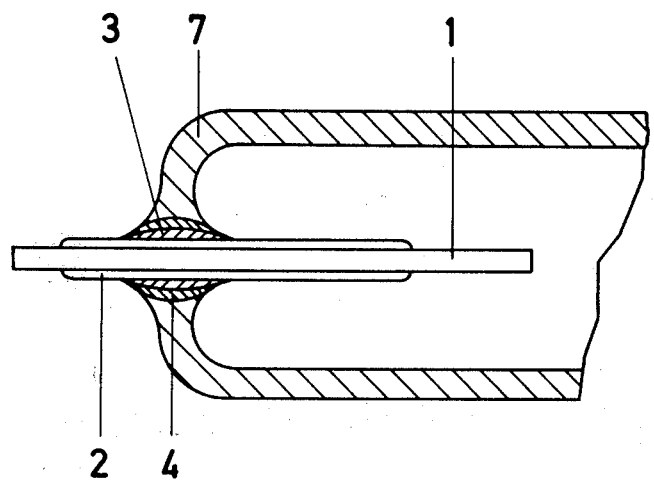
FIG. 2 is a fractional transverse longitudinal, part sectional view showing the electrode lead connected into the end wall of a high-pressure lamp vessel.

A quartz glass cylinder having a linear thermal coefficient of expansion of $6 \cdot 10^{-7}/°$ C.—see FIGS. 1d and 1e—is symmetrically placed on the coating 3 and melted on, see FIG. 1c, so that a bead 5 will form around the wire, as clearly seen in FIG. 1c and in FIG. 2, where the respective glasses of coatings 3 and 4 are differently cross-hatched. The oxidation-protective glass 6 can be applied thereafter. The oxidation-protective coating is a glass having the following composition (all percentages by weight):

| 69.3% | of | $SiO_2$ |
|---|---|---|
| 16.0 | | $B_2O_2$ |
| 4.5 | | $Al_2O_3$ |

-continued

| 1.2 | BaO |
|---|---|
| 3.9 | $Na_2O$ |
| 3.1 | $K_2O$ |
| 1.0 | $Sb_2O_3$. |

This glass has a linear thermal coefficient of expansion of $45 \cdot 10^{-7}/°$ C., which is the same as that of the tungsten rod 1.

In accordance with the present invention, and in contrast to the use of transition glasses of the prior art, the glasses of respectively different thermal coefficient of expansion are not applied as ring-shaped cylinders within a wall of an internal cap, or the tubular extension of the high-pressure lamp itself, but they are applied, rather, radially about the conductor 1 itself. It has been found that the first coating 2 must be substantially longer than the other, and that the second coating cannot overlap the first one and contact the rod 1 itself. Overlap of the coating 3 over the coating 2 and on the rod 1 itself would result in undesirable stresses, which greatly reduces the strength of the melt and the adhesion of the respective glasses to the next-underlying layer. A long free space of the coating 2 with respect to the coating 3—see FIG. 1b—protects the wire itself with respect to the high melt-in temperatures of about 2000° C., by shielding the blank, free metal conductor 1 from the high-temperature, thereby preventing changes in diameter of the metallic conductor during melt-on of the layer 3 and subsequently of the layer 4. The quartz glass of the lamp end wall itself is not directly melted on over the last transition glass, that is, over the coating or glass sleeve 3, but rather is melted on to a short quartz glass cylinder itself. The operating temperatures for melting-on of various transition glasses are in the order of between 660° to 800° C. Quartz glass, however, requires a working temperature of about 2000° C. A short cylinder of quartz glass, having a diameter which depends on the number of the transition glasses applied, sequentially, over the conductor 1—in the present example two of them are shown—can easily be heated with a passing flame in such a manner that it reliably melts on unto the underlying transition glasses without, however, loading the transition glasses thermally to such an extent as would be the case if a glass end wall of the vessel of the lamp itself were to be connected directly to a transition glass. The result is a subassembly of the rod 1, glasses 2 and 3, and quartz cylinder 4. After melting-on of the quartz cylinder 4 (FIG. 1d, FIG. 1e, FIG. 2), the entire melt is heated again to a temperature sufficient to release possible stresses. Due to the low heat capacity of the very short cylinder of quartz glass (FIGS. 1d, 1e), which has a length which does not deviate materially from the wall thickness of the end wall of the vessel of the discharge lamp itself, the actual heat content necessary to cause complete melting-in of the electrode with the surrounding bead is so low that the melt-in process can be carried out quickly before the transition glasses beneath the quartz ring 4 are thermally substantially stressed. Thus, the thermal stress on the transition glasses beneath the quartz glass cylinder is much less than in the systems of the prior art, permitting working with high temperatures and resulting in a melt-in which has excellent mechanical properties and permits high mechanical loading. The essentially (in cross section) circular bead 5 which results, which is rounded at the axial ends and which is without fissures or corners towards the inside as well as towards the outside, permits a melt-in of the outer quartz glass component of the bead 5 into a quartz glass wall in which, when the process is completed, the melt is subjected only to compressive forces or stresses.

The transition glasses can be applied in the form of solid rods and melted on the wire or the underlying glass layer, respectively, or can consist of caning in tubular form, as shown, for example, with respect to the quartz glass cylinder 4, FIGS. 1d, 1e. The metallic conductor 1 preferably is anodically polished before melting-in within the discharge vessel. The glass 6, preferably applied to the outside end portion of the conductor, protects the outside portion of the conductor against oxidation.

The connection can be easily made, and permits saving of several working steps, materials and energy with respect to previously utilized processes, so that the costs of the melt-in with respect to connections of the prior art can be reduced by about a third. The mechanical loading of the overall melt can be increased with respect to the prior art structures. Internal melt caps usually had dome or cap structures of a wall thickness which customarily had a dimension of only 1/10, roughly, with respect to the outer wall of the vessel itself. These thin components of the vessel were a weak point thereof.

The socket end of the overall lamp can be shortened since the melt-in connection in accordance with the invention does not require any internal cap or dome structures. The melt-in connection can be applied to various types of lead-in conductors 1, in rod form or wire form, of various cross-sectional shapes, in which a circular cross section is preferred. The lead-in connection can be used with various types of lamps, such as discharge lamps, Xenon discharge lamps, halogen-cycle incandescent lamps, and the like—in short, wherever a connection of a solid, for example tungsten electrode through a quartz glass wall is needed.

FIGS. 1a to 1c show a melt-in arrangement in which two transition glasses are used, of progressively decreasing thermal coefficient of expansion, in combination with a quartz glass cylinder having a thermal coefficient of expansion matching that of the vessel itself. More than one such transition glass coating may be used, and if so, the respective axial length thereof decreases, progressively, toward the outermost one, formed by the quartz glass cylinder 4. The length of the innermost coating then will be determined by the number of transition glass layers which are applied, with the innermost glass coating being substantially longer than the next-applied glass coating to prevent any overlap of the next-applied coating over the first one, and thus introduction of stresses. Likewise, overlap between successive transition glasses should preferably be avoided, although the matter is less serious due to the decreasing wall thickness, see FIG. 2, in which the approximate cross section of a bead is illustrated.

Compositions of glasses which have the requisite thermal coefficient of expansion can readily be determined from known and available literature. When initially applied, the axial length of the quartz glass cylinder 4 should be approximately twice the thickness of the end wall 7 with which the melt is to be used, or somewhat less, so that, when the bead and the melt connection is formed, the eventual length of the melted cylinder 4 and the flowing connection of the end wall 7 will at least roughly match, as seen in the cross section of FIG. 2.

Various changes and modifications may be made within the scope of the inventive concept.

I claim:

1. High melting point glass-to-metal seal and melt connection subassembly in combination with a glass structure having a wall (7) to carry a metallic electrical rod-like conductor (1) having a first thermal coefficient of expansion essentially transversely through the glass wall (7), in which the glass has a thermal coefficient of expansion which is small with respect to said first coefficient of expansion, said combination including
a plurality of layers of glass having progressively smaller thermal coefficients of expansion interposed between the rod-like conductor (1) and the glass wall (7), and in which the melting point of the glass forming said wall (7) is substantially higher than that of at least some of said glasses,
wherein said layers of glass comprise
a first glass (2) melted on and surrounding the conductor (1) and extending thereon over a predetermined axial length;
a further glass (3) melted on said first glass and being axially shorter than said first glass and positioned intermediate the length of the first glass;
and a glass cylinder (4) having a melting point at least substantially equal to that of the glass wall and substantially higher than that of the next adjacent further glass (3), melted on the further glass (3), the glass cylinder having an axial length which is approximately the same as the wall thickness of the wall (7).

2. The combination according to claim 1, wherein the glass cylinder (4) forming the melt connection is in the form of a bead.

3. The combination according to claim 2, wherein the length of the glass cylinder (4), before being melted on the further glass (3), is up to about twice the thickness of the glass wall (7).

4. The combination according to claim 1, wherein the projecting length of the first glass (2) on the conductor (1) beyond the termination point of the further glass (3) is at least about 4 mm in at least one direction of the conductor.

5. An electric lamp
comprising the combination of claim 1
wherein the electrical conductor (1) is a tungsten rod or wire;
the glass wall (7) comprises at least a portion of the envelope of the lamp and is quartz glass;
and the glass cylinder (4) is a quartz glass cylinder having, before being melted, an axial length of up to about twice the wall thickness of the end wall, the first glass extending beyond the end of the further glass into the interior of the lamp for a distance of at least about 4 mm.

6. A high-pressure discharge lamp, for operating pressure of up to about 35 atm.,
comprising the combination of claim 1
wherein the metallic electrical conductor is a tungsten rod of about 2 mm diameter; the first glass comprises a glass having a linear thermal coefficient of expansion of about $19.10^{-7}/°$ C. of about 2 cm length;
the further glass (3) has a linear thermal coefficient of expansion of about $13.10^{-7}/°$ C. and is less than half as long as the first glass and applied non-symmetrically with respect thereto; and the cylinder (4) comprises quartz glass having a linear thermal coefficient of expansion of about $6.10^{-7}/°$ C. and an axial length, before being melted, of about 4 mm.

7. Lamp according to claim 6, wherein the wall thickness of the cylinder, before melting, is about 1 mm, and the thickness of the further glass, before being melted, is between about 0.5 to 2 mm, the thickness of the first glass, being directly applied to the wire, being less than the thickness of the further glass.

8. Lamp according to claim 7, wherein the second glass and the cylinder, when melted, form a circumferential bead;

and the first glass extends into the interior of the lamp for a distance of at least 4 mm from the axial inner termination of said bead.

9. The combination according to claim 1 wherein the rod-like conductor is a tungsten rod.

10. The combination according to claim 9 wherein the tungsten rod has a diameter in the order of 2 mm.

11. The combination according to claim 9 wherein the wall (7) is quartz glass;

the first glass comprises a glass having a linear thermal coefficient of expansion of about $19.10^{-7}/°$ C.;

the further glass has a linear thermal coefficient of expansion of about $13.10^{-7}/°$ C. and an axial length less than half as long as the first glass;

and the glass cylinder (4) has a linear thermal coefficient of expansion similar to that of the wall (7).

12. A method to make a melt connection of a metal conductor (1) through the wall (7) of a lamp envelope made of high melting point glass utilizing the steps of melting-on a first glass covering (2) over the conductor, said first glass covering having a linear thermal coefficient of expansion between that of the metal of the conductor and the high melting point glass;

melting-on a further glass convering (3) over said first glass covering, said further glass covering being of an axial length which is shorter than said first covering and including at least one layer of transition glass with each layer of transition glass applied having a lower thermal coefficient of expansion than the previously applied layer of transition glass, and including, in accordance with the invention, the further steps of melting-on a cylinder (4) of the same high melting point glass as the envelope on the outermost transition glass forming the further glass covering (3), said cylinder having an axial length which is shorter than said further covering and in the order of the thickness of the wall (7) of the lamp envelope to form the outermost layer of a subassembly;

and then melting in the cylinder of said high melting point glass forming the outermost layer of the subassembly through and into the wall (7) of the envelope.

13. The method according to claim 12, wherein said lamp envelope comprises quartz glass; and said cylinder (4) comprises quartz glass.

14. The method according to claim 12, wherein the step of melting-on the cylinder (4) of high melting point glass to the further glass covering comprises melting-on said cylinder and forming a bead.

15. The method according to claim 14, wherein the length of the high melting point glass cylinder is up to about twice the thickness of the wall (7) of the lamp envelope.

16. The method according to claim 14, wherein the step of melting-on said first glass covering comprises melting-on a glass covering (2) on the conductor which has a length extending by about 4 mm from the bead in at least one direction on the conductor (1).

17. The method according to claim 12, wherein the conductor is a tungsten rod in the order of about 2 mm diameter, the step of melting-on the first glass covering (2) comprises melting-on a glass having a linear thermal coefficient of expansion of about $19 \cdot 10^{-7}/°$ C.; the step of melting-on the further glass covering (3) comprises melting-on a glass having a linear thermal coefficient of expansion of $13 \cdot 10^{-7}/°$ C., and of a length less than half as long as said first glass covering;

and the step of melting-on the high melting temperature glass comprises melting-on a cylinder of quartz glass having a linear thermal coefficient of expansion of about $6 \cdot 10^{-7}/°$ C.

18. The method according to claim 12, wherein the step of melting-in the cylinder of said high melting point glass forming the outermost layer of the subassembly into the wall of the envelope comprises melting-in said subassembly into the wall which extends essentially transversely to the region of the melt-in connection or junction.

* * * * *